(12) United States Patent
Wu et al.

(10) Patent No.: US 11,221,515 B1
(45) Date of Patent: Jan. 11, 2022

(54) BACKLIGHT MODULE

(71) Applicant: SUNREX TECHNOLOGY CORP., Taichung (TW)

(72) Inventors: Chih-Hsien Wu, Taichung (TW); Shih-Pin Lin, Taichung (TW); Li-Ling Huang, Taichung (TW); Hsiang-Yi Chen, Taichung (TW)

(73) Assignee: SUNREX TECHNOLOGY CORP., Taichung (TW)

( * ) Notice: Subject to any disclaimer, the term of this patent is extended or adjusted under 35 U.S.C. 154(b) by 0 days.

(21) Appl. No.: 17/345,025

(22) Filed: Jun. 11, 2021

(30) Foreign Application Priority Data

Jan. 4, 2021 (TW) .................................. 110100117

(51) Int. Cl.
*G02F 1/13357* (2006.01)
*F21V 8/00* (2006.01)
*G02B 6/42* (2006.01)

(52) U.S. Cl.
CPC ..... *G02F 1/133603* (2013.01); *G02B 6/0031* (2013.01); *G02B 6/0073* (2013.01); *G02B 6/428* (2013.01); *G02B 6/0083* (2013.01)

(58) Field of Classification Search
CPC ............ G02F 1/133603; G02B 6/0031; G02B 6/0073; G02B 6/428; G02B 6/0083
See application file for complete search history.

(56) References Cited

U.S. PATENT DOCUMENTS

2007/0126950 A1* 6/2007 Kurihara ............... G02B 6/0023
349/65

FOREIGN PATENT DOCUMENTS

WO WO-2006129625 A1 * 12/2006 ........... G02B 6/0068

* cited by examiner

*Primary Examiner* — Mary Ellen Bowman
(74) *Attorney, Agent, or Firm* — Burris Law, PLLC

(57) ABSTRACT

A backlight module adapted for use in an input device includes a circuit board, a light guide plate, a plurality of light-emitting elements, and a reflective structure. The light guide plate disposed on the circuit board is formed with a microstructure. The reflective structure includes a reflective plate disposed on the light guide plate opposite to the circuit board, and a first reflective layer disposed on the reflective plate opposite to the light guide plate. The first reflective layer is configured to allow a portion of a light emitted from the light-emitting elements to pass therethrough, and to allow a portion of the light to be reflected back to the light guide plate and then be diffuse reflected by the microstructure formed on the light guide plate.

9 Claims, 4 Drawing Sheets

BACKLIGHT MODULE

CROSS-REFERENCE TO RELATED APPLICATION

This application claims priority of Taiwanese Invention Patent Application No. 110100117, filed on Jan. 4, 2021.

FIELD

The disclosure relates to a light module, and more particularly to a backlight module adapted for use in an input device (such as a keyboard).

BACKGROUND

A conventional input device such as a keyboard includes a circuit board, a plurality of tactile switches that are disposed on a top surface of the circuit board, and a plurality of keycaps that correspond in position to and that cover the tactile switches. The tactile switches are triggered by tapping the keycaps. The keycaps are painted with different characters on upper surfaces thereof, so as to assist users of the keyboard in differentiating various meanings of the keycaps. In addition, in order to allow the keyboard to be used in a dark environment, a keyboard having a backlight module was developed. Instead of painting the characters, for each of the keycaps of such keyboard, a portion of the keycap which has a shape corresponding to the character is configured to be optically transmissible, while the remaining portion of the keycap is configured to be optically non-transmissible. The backlight module is disposed between the keycaps and the circuit board, such that a light emitted from the backlight module transmits through the optically transmissible portion (i.e., the characters) of each of the keycaps. Thus, the characters on the keycaps can be illuminated in the dark environment and can be identified by the users through the light transmitted through the keycaps.

However, a conventional backlight module used in the keyboard usually includes a plurality of light-emitting elements, and the light emitted therefrom might be focused on certain regions of the characters, causing uneven illumination of the characters. This would lead to an unsatisfactory appearance of the characters, or even difficulty in identifying the characters, and would result in a poor user experience, thereby reducing product sales.

SUMMARY

Therefore, an object of the disclosure is to provide a backlight module that can alleviate at least one of the drawbacks of the prior art.

According to the disclosure, the backlight module includes a circuit board, a light guide plate, a plurality of light-emitting elements and a reflective structure.

The light guide plate is disposed on the circuit board, and has a lower surface and an upper surface that are respectively proximal to and distal from the circuit board. The light guide plate is formed with a plurality of through holes extending from the upper surface to the lower surface, and is formed with a microstructure on the lower surface. The light-emitting elements are disposed in the through holes. The reflective structure includes a reflective plate which is disposed on the upper surface of the light guide plate to cover the through holes, and a first reflective layer which is disposed on the reflective plate opposite to the light guide plate. The first reflective layer is made of a reflective material. The first reflective layer is configured to allow a portion of a light emitted from the light-emitting elements to pass therethrough, and to allow a portion of the light to be reflected back to the light guide plate. The light reflected back to the light guide plate is then diffuse reflected by the microstructure formed on the lower surface.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
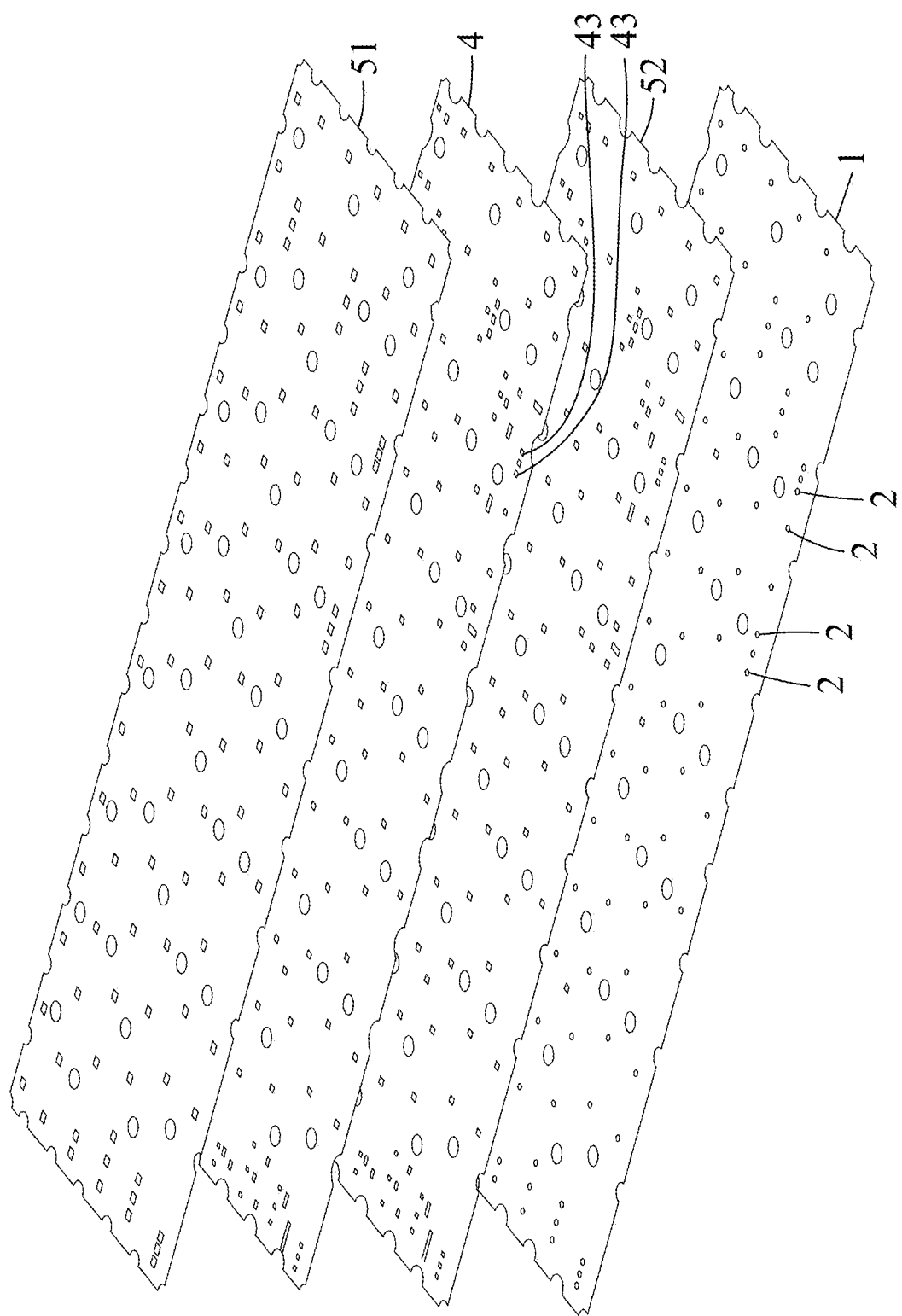
FIG. 1 is an exploded perspective view illustrating an embodiment of a backlight module according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
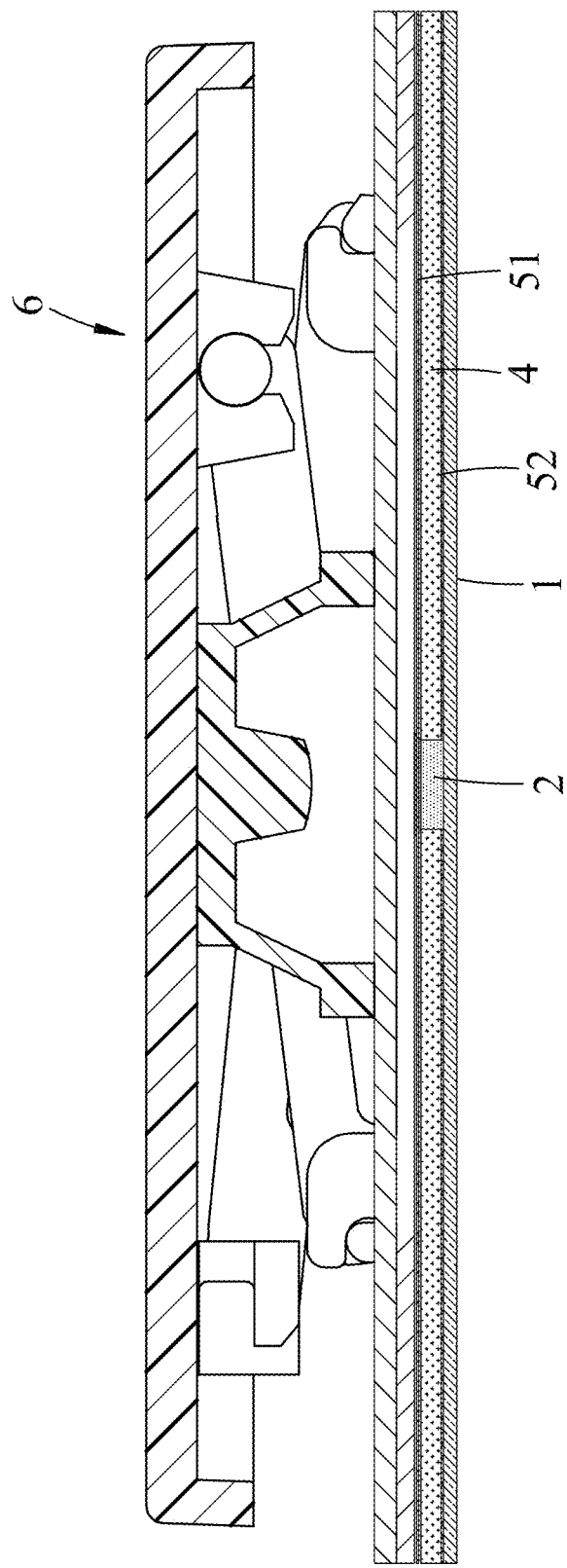
FIG. 2 is a fragmentary schematic sectional view illustrating the embodiment of the backlight module being applied in a keyboard.
Figure 3:
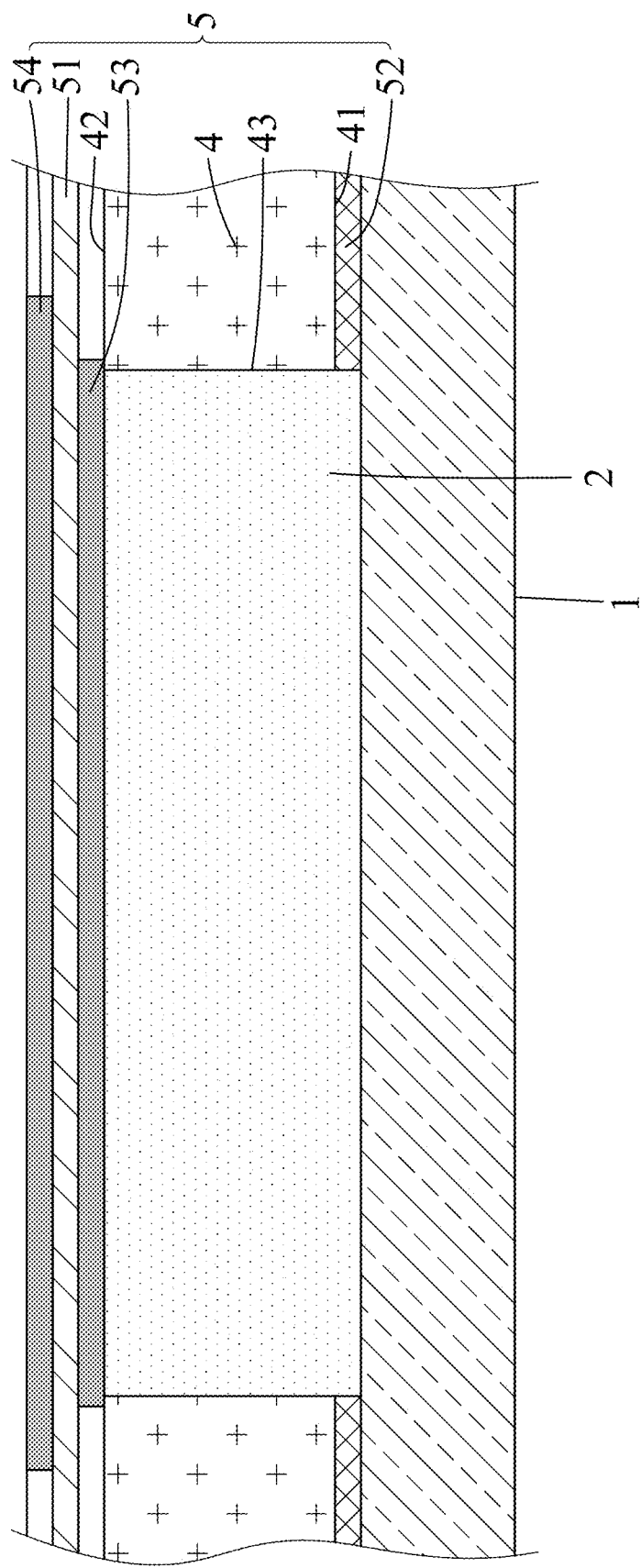
FIG. 3 is an enlarged view of the embodiment of the backlight module shown in FIG. 2.

Referring to FIGS. 1 to 3, an embodiment of a backlight module includes a circuit board 1, a light guide plate 4, a plurality of light-emitting elements 2 and a reflective structure 5.

The light guide plate 4 is disposed on the circuit board 1, and has a lower surface 41 and an upper surface 42 that are respectively proximal to and distal from the circuit board 1. The light guide plate 4 is formed with a plurality of through holes 43 which extends from the upper surface 42 to the lower surface 41. The light guide plate 4 is formed with a microstructure on the lower surface 41.

The light-emitting elements 2 are disposed in the through holes 43. In this embodiment, each of the light-emitting elements 2 is a light-emitting diode (LED), which is capable of being easily controlled by signals, and which may emit light having a predetermined wavelength such as white light, monochromatic light, or a mixed light formed by blending monochromatic lights of different colors (e.g., RGB system).

The reflective structure 5 includes a reflective plate 51 which is disposed on the upper surface 42 of the light guide plate 4 to cover the through holes 43, and a first reflective layer 54 disposed on the reflective plate 51 opposite to the light guide plate 4. The reflective structure 5 may further include a second reflective layer 53 which is disposed between the reflective plate 51 and the light guide plate 4. Each of the first reflective layer 54 and the second reflective layer 53 is configured to allow a portion of the light emitted from the light-emitting elements 2 to pass therethrough, and is configured to allow a portion of the light to be reflected back to the light guide plate 4. Each of the first reflective layer 54 and the second reflective layer 53 may be independently made of a reflective material. The reflective material for making each of the first reflective layer 54 and the second reflective layer 53 may independently include, but is not limited to, white ink. Other reflective materials that are well known to those skilled in the art may also be used according to practical needs.

Figure 4:
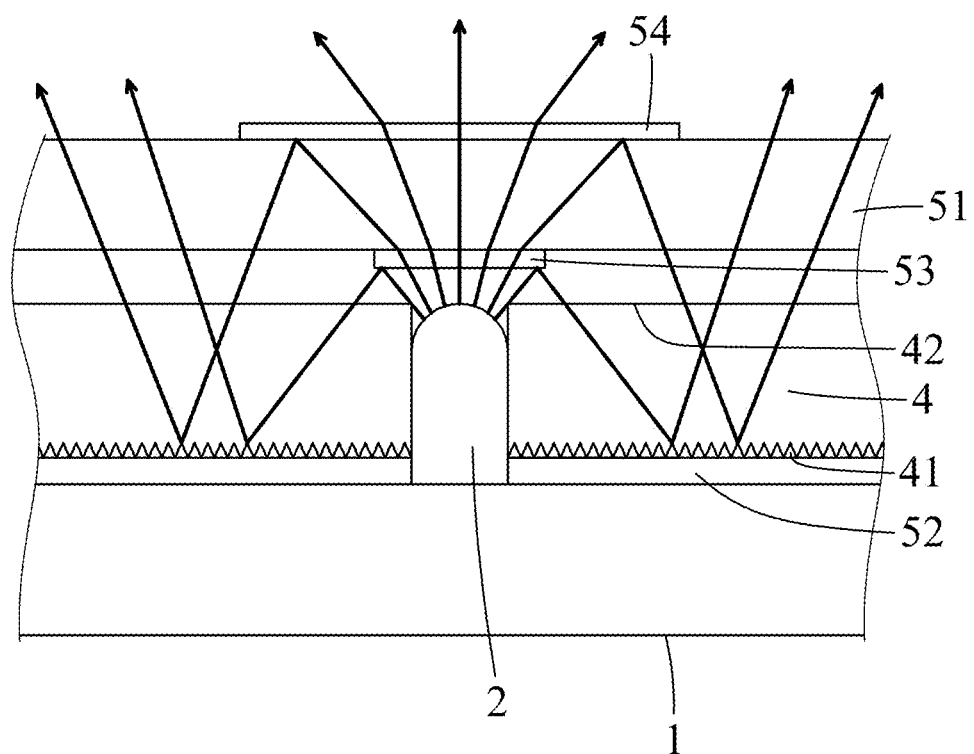
FIG. 4 is a schematic view illustrating light path of a light emitted by light-emitting elements of the embodiment of the backlight module.

Referring to FIG. 4, in use, the light emitted from the light-emitting elements 2 may first reach the second reflective layer 53. The second reflective layer 53 is configured to allow a portion of the light to pass therethrough and then reach the first reflective layer 54, and is also configured to allow a portion of the light to be reflected back to the light guide plate 4. The portion of the light reaching the first reflective layer 54 is allowed to partially pass through the first reflective layer 54, and the remaining portion of the light not passing through the first reflective layer 54 is reflected back to the light guide plate 4. The light reflected from the second reflective layer 53 and/or the first reflective layer 54 back to the light guide plate 4 is then diffuse reflected by the microstructure formed on the lower surface 41 of the light guide plate 4. The diffuse reflected light may be transmitted back to the reflective structure 5 at various angles, and then may pass therethrough or partially reflected thereby.

The abovementioned reflection (by the second reflective layer 53 and/or the first reflective layer 54) and diffuse reflection may be repeated several times, such that the light emitted from the light-emitting elements 2 is evenly scattered between the light guide plate 4 and the reflective plate 51 until the light exits the first reflective layer 54.

The reflective structure 5 may further include a third reflective layer 52, which is disposed between the light guide plate 4 and the circuit board 1. Since light may also pass through the lower surface 41, the third reflective layer 52 is capable of reflecting the light back to the light guide plate 4, which can further improve light utilization efficiency.

In this embodiment, the circuit board 1, the third reflective layer 52, the light guide plate 4, the second reflective layer 53, the reflective plate 51 and the first reflective layer 54 are parallelly stacked on one another to form a layered structure. Therefore, the backlight module of this disclosure, which can be easily constructed and thin, may be suitably used in an input device such as a keyboard 6 (see FIG. 2). The resultant device may have a reduced weight and thickness, and characters on the keyboard 6 may be evenly lightened, so as to fulfill a user's need, and improves user experience and product sales.

To conclude, by forming the reflective structure 5 and the microstructure of the light guide plate 4, the light emitted from the light-emitting elements 2 can be evenly scattered by the backlight module of this disclosure.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A backlight module adapted for use in an input device, comprising:
   a circuit board;
   a light guide plate which is disposed on said circuit board, and which has a lower surface and an upper surface that are respectively proximal to and distal from said circuit board, said light guide plate being formed with a plurality of through holes extending from said upper surface to said lower surface, and being formed with a microstructure on said lower surface;
   a plurality of light-emitting elements which are disposed in said through holes; and
   a reflective structure which includes a reflective plate disposed on said upper surface of said light guide plate to cover said through holes, and a first reflective layer disposed on said reflective plate opposite to said light guide plate, wherein said first reflective layer is made of a reflective material, and is configured to allow a portion of a light emitted from said light-emitting elements to pass therethrough and to allow a portion of the light to be reflected back to said light guide plate and then be diffuse reflected by said microstructure formed on said lower surface,
   wherein said reflective structure further includes a second reflective layer which is disposed between said reflective plate and said light guide plate, and which is made of a reflective material, said second reflective layer being configured to allow a portion of the light to pass therethrough and then reach said first reflective layer, and being configured to allow a portion of the light to be reflected back to said light guide plate and then be diffuse reflected by said microstructure formed on said lower surface.

2. The backlight module of claim 1, wherein said reflective material for making said second reflective layer includes white ink.

3. The backlight module of claim 1, wherein said reflective material for making said first reflective layer includes white ink.

4. The backlight module of claim 1, wherein said reflective structure further includes a third reflective layer which is disposed between said light guide plate and said circuit board for reflecting the light passing through said lower surface back to said light guide plate.

5. The backlight module of claim 1, wherein each of said light-emitting elements is a light-emitting diode.

6. A backlight module adapted for use in an input device, comprising:
   a circuit board;
   a light guide plate which is disposed on said circuit board, and which has a lower surface and an upper surface that are respectively proximal to and distal from said circuit board, said light guide plate being formed with a plurality of through holes extending from said upper surface to said lower surface, and being formed with a microstructure on said lower surface;
   a plurality of light-emitting elements which are disposed in said through holes; and a reflective structure which includes a reflective plate disposed on said upper surface of said light guide plate to cover said through holes, and a first reflective layer disposed on said reflective plate opposite to said light guide plate, wherein said first reflective layer is made of a reflective material, and is configured to allow a portion of a light emitted from said light-emitting elements to pass therethrough and to allow a portion of the light to be reflected back to said light guide plate and then be diffuse reflected by said microstructure formed on said lower surface, wherein said reflective structure further includes a third reflective layer which is disposed between said light guide plate and said circuit board for reflecting the light passing through said lower surface back to said light guide plate.

7. The backlight module of claim 6, wherein said reflective structure further includes a second reflective layer which is disposed between said reflective plate and said light guide plate, and which is made of a reflective material, said second reflective layer being configured to allow a portion of the light to pass therethrough and then reach said first reflective layer, and being configured to allow a portion of the light to be reflected back to said light guide plate and then be diffuse reflected by said microstructure formed on said lower surface, and wherein said reflective material for making said second reflective layer includes white ink.

8. The backlight module of claim 6, wherein said reflective material for making said first reflective layer includes white ink.

9. The backlight module of claim 6, wherein each of said light-emitting elements is a light-emitting diode.

\* \* \* \* \*